US010455290B2

(12) United States Patent
Teoh

(10) Patent No.: US 10,455,290 B2
(45) Date of Patent: *Oct. 22, 2019

(54) METHOD AND SYSTEM FOR DISTANCE BASED VIDEO ADVERTISEMENT REWARD SYSTEM WITH INSTANT DYNAMIC PRICE GENERATION FOR DIGITAL MEDIA PROPAGATION

(71) Applicant: Andrew Teoh, Little Falls, NJ (US)

(72) Inventor: Andrew Teoh, Little Falls, NJ (US)

(73) Assignee: Exaclick Corporation, Lewes, DE (US)

( * ) Notice: Subject to any disclaimer, the term of this patent is extended or adjusted under 35 U.S.C. 154(b) by 60 days.

This patent is subject to a terminal disclaimer.

(21) Appl. No.: 15/392,150

(22) Filed: Dec. 28, 2016

(65) Prior Publication Data

US 2017/0111700 A1    Apr. 20, 2017

Related U.S. Application Data

(63) Continuation of application No. 14/214,892, filed on Mar. 15, 2014, now Pat. No. 9,584,863.

(60) Provisional application No. 61/802,095, filed on Mar. 15, 2013.

(51) Int. Cl.
*G06Q 30/02*    (2012.01)
*G06Q 10/10*    (2012.01)
*H04N 21/4784*    (2011.01)
*H04N 21/435*    (2011.01)
*H04N 21/81*    (2011.01)
*H04N 21/262*    (2011.01)

(Continued)

(52) U.S. Cl.
CPC ..... *H04N 21/4784* (2013.01); *G06Q 30/0269* (2013.01); *H04N 21/262* (2013.01); *H04N 21/435* (2013.01); *H04N 21/4627* (2013.01); *H04N 21/812* (2013.01); *H04L 67/02* (2013.01)

(58) Field of Classification Search
None
See application file for complete search history.

(56) References Cited

U.S. PATENT DOCUMENTS 6,675,165 B1    1/2004 Rothschild
7,349,668 B2    3/2008 Ilan et al.
7,613,630 B2    11/2009 Wolinsky et al.
(Continued)

*Primary Examiner* — Nasser M Goodarzi
*Assistant Examiner* — Terrika Peterson
(74) *Attorney, Agent, or Firm* — Hsuanyeh Law Group, PC

(57) ABSTRACT

Asynchronous data exchange between an enhance digital signage unit and user guided digital content management system which charges external advertisers with appropriate pricing and payment system based of duration of length of digital data media, distance of digital information content being exposed from a center point of a business entity, time of day, frequency of the digital information content is being repeated in a period of time and number of business agents within a selected distance chosen by the external advertiser. A fraction of the charges are rewarded to business agents that participated in the advertising network. Each digital information content is linked to the internal database of the digital content management system with a unique marketing phrase or short recognizable word combination to assist prospective consumers in referencing to the origin of the product or services ultimately back to the external advertisers.

7 Claims, 12 Drawing Sheets

(51) Int. Cl.
*H04N 21/4627* (2011.01)
*H04L 29/08* (2006.01)

(56) References Cited

U.S. PATENT DOCUMENTS

| | | | |
|---|---|---|---|
| 7,890,873 B2 | 2/2011 | Evans | |
| 7,941,269 B2 | 5/2011 | Laumeyer et al. | |
| 8,036,932 B2 | 10/2011 | Cline, Jr. et al. | |
| 8,041,667 B2 | 10/2011 | Otto et al. | |
| 8,112,310 B1 | 2/2012 | Yehoshua et al. | |
| 8,229,458 B2 | 7/2012 | Busch | |
| 8,229,781 B2 | 7/2012 | Zenor et al. | |
| 8,255,949 B1 * | 8/2012 | Bayer | G06Q 30/0241 725/32 |
| 8,315,905 B1 | 11/2012 | Adair | |
| 8,360,864 B2 | 1/2013 | Dickerson | |
| 8,364,171 B2 | 1/2013 | Busch | |
| 8,370,760 B2 | 2/2013 | Yamazaki | |
| 8,577,819 B2 | 11/2013 | Otto et al. | |
| 8,606,630 B2 | 12/2013 | Fordyce, III et al. | |
| 9,584,863 B1 * | 2/2017 | Teoh | H04N 21/4784 |
| 2001/0056369 A1 | 12/2001 | Takayama et al. | |
| 2002/0177435 A1 * | 11/2002 | Jenkins | H04L 51/38 455/412.1 |
| 2006/0109734 A1 * | 5/2006 | Fukuda | G06Q 30/02 365/232 |
| 2006/0200381 A1 * | 9/2006 | Elkholy | G06Q 30/02 705/14.61 |
| 2008/0250447 A1 | 10/2008 | Rowe et al. | |
| 2009/0077196 A1 * | 3/2009 | Brabec | G06Q 10/10 709/217 |
| 2009/0122749 A1 | 5/2009 | Byun | |
| 2010/0118200 A1 * | 5/2010 | Gelman | G06F 3/041 348/578 |
| 2011/0282727 A1 * | 11/2011 | Phan | G06Q 10/10 705/14.36 |
| 2012/0310717 A1 * | 12/2012 | Kankainen | G06Q 30/02 705/14.4 |
| 2013/0132198 A1 * | 5/2013 | Park | G06Q 30/0261 705/14.54 |
| 2014/0278847 A1 * | 9/2014 | Gallo | G06Q 30/0252 705/14.5 |

\* cited by examiner

Typical Prior Art

Typical Prior Art

Typical Prior Art

METHOD AND SYSTEM FOR DISTANCE BASED VIDEO ADVERTISEMENT REWARD SYSTEM WITH INSTANT DYNAMIC PRICE GENERATION FOR DIGITAL MEDIA PROPAGATION

RELATED APPLICATIONS

This application is a Continuation of U.S. Nonprovisional application Ser. No. 14/214,892, filed on Mar. 15, 2014, which claims the benefit of priority to U.S. Provisional Application No. 61/802,095, entitled "Back Searchable Video Advertisement System with Sensor Enabled Digital Signage," filed on Mar. 15, 2013, the entire contents of both of which are incorporated herein by reference for all purposes.

BACKGROUND

Digital signage system are systems that transmit digital video information to targeted digital signage display hardware which also may include text or characters information. These digital video systems are made in a form of an advertisement, to allow potential customers to recognize and get awareness of a product or service. The digital signage display hardware is designed to be installed in a common public area, especially in brick and mortar shops or physical business premises. The video advertising content can be stored on a memory media or transmitted from a management server system that communicates with the digital signage unit via utilizing the internet technology.

Many factors do contribute to the effectiveness of such advertisements, predominantly the location, time of day, and people viewing these advertisement. Video advertisements are linear two dimensional media, which means when a video advertisements is being played as time passes, there is a limited chance of an audience to view such an advertisement. Most often, after an advertisement was played, a potential customer or audience may not remember the key points of what they had seen. Without proper mechanism to allow the information relayed to be remembered, this may defeat the purpose of an advertisement hence making the advertisement less effective.

In reference to a typical prior art system, in FIG. 1, a business owner may choose to use a localize digital signage system 102, which necessitate the business owner to perform regular maintenance in managing the digital content or advertisements that are being displayed onto their own digital signage device. This is shown at business subscriber 110 and digital signage unit 112. This can be cumbersome, and may involve hiring a small marketing team in managing the localize content of the digital signage ultimately increasing cost and time. Without scheduled or regular maintenance of getting fresh advertisement or information content, the information displayed on a digital signage device may become stale, which in the long run may discourage audience in viewing the information display, again defeating the purpose of advertising.

A lesser cumbersome method is by utilizing a cloud digital signage system 104. When a business owner 114 decides to advertise through such a system, he or she may contact the advertisement department of the third party company that is running the digital signage cloud services 104. However, the process of finalizing the advertisement propagation may not be as easy as an autonomous solution. One important factor is finalizing the actual price of advertising a content, which maybe dependent on the space, time, and location of the digital signage unit. The hassle of acquiring a price of that particular advertisement has to be calculated by the advertising department, which is not revealed instantly. Such progression in order to get an advertisement out to the masses, maybe critical especially when it comes to volatile services or products where information is required to be relayed to the public in more faster fashion, e.g. a store manager decides to run an additional 2 hour aggressive sale at the very last minute, in order to compete with his or her neighbor.

Another scenario is the type of targeted audience that the advertisement should be delivered. Most systems transmit advertisements to any general digital signage unit, which maybe loss of resources, since as mentioned before digital signage advertisement is limited with the time factor and chances of a patron would see the advertisement maybe affected. A possible negative scenario; it is not very encouraging to actually see a competition's advertisement played on a business owner facility digital signage hardware, when the purpose of the whole idea of having the digital signage in the facility is to actually promote the business owner's business. Without the proper algorithm, advertisements that are not delivered to their target, cannot generate maximum positive results for the advertisers.

With current prior art method, customers 108 that have visualize the advertisements from a digital signage have to perform a relative search of what they have seen on a forth party search engine 106. Very frequently such act of searching may result to inaccurate search backs to the original business that was trying to advertise the product or services. Not all searches yield improper results, but since all designed search engine are very key word specific, the results maybe unexpected and unsatisfactory.

SUMMARY

It is necessary for the display of advertisement to be fresh and constantly updated. It is also important for potential customer to remember what they saw or else it defeats the purpose of the advertisement or information being displayed. It is also necessary to understand that all digital signage are limited to a two dimensional time versus advertisement displayed scale. According to this embodiment, a digital signage device can only display a limited amount of advertisement a day. The above challenges where the digital signage industry faces, can be minimized and situation improved upon the methodology and application being presented in this embodiment.

Incidentally, it is essential for potential customers to actually recognize and remember what they have saw on a digital signage device. As the advertisement being played, potential customer maybe confined with amount of time, may not have the luxury to view the entire message of the advertisement, due to the two-dimensional effect of the advertisement. Another scenario which could be possible is that the advertisement that is being shown may have too many key or crucial points, which ultimately may cause the potential customer to not grasp the entire message of the advertisement.

Within this embodiment, it introduces a scheme or method where it helps the potential customer to actually retrieve the advertisement shown. A simple searchable word, which is described as a recognizable marketing phrase, is linked to each advertisement video that is being played. This marketing phrase is fundamentally placed on the same time line as an advertisement that is being played. These marketing phrase are constrained to be short simple words or recognizable in the context of the spoken language of a society. Upon viewing an advertisement, a potential customer may commit to memory or capture these phrases and eventually searching against these marketing phrases on a referenced search engine designed into the system, to retrieve the information or advertisement seen.

To overcome the day time limitation of amount of advertisement that could be displayed per day, is to get more digital signage devices out to the public. However, most business or companies do not have the resources or time dedicated for managing the content of the digital signage devices. According to this embodiment, a centralized advertisement system can help to transmit all relative external advertisement to owners within a targeted distance. This ensures that the advertisements are always in a fresh state. In another embodiment, the system presented is designed to provide a fair instant final price for each advertisement submitted into the system. Advertisers can immediately make a payment towards the services, to allow immediate propagation of the advertisement. When the act of submitting an advertisement becomes fast and easy, this ensures that the content on every digital signage unit governed by the embodiment of this system is always fresh and interesting.

To help increase the number of digital signage, which ultimately increases the information and advertising relay agent, an incentive should be given. The embodiment describes an autonomous periodically monetary reward payout method as a form of the incentive. These monetary rewards are taken from the fees charged against an external advertiser that rents the air time from a business owner which is an agent to the digital content management system that currently owns one or a plurality of digital signage units.

Furthermore, according to another embodiment of the described system, the system enables a faster propagation of digital information content externally, since external advertisers do not have to interact with the business owners that actually own the digital signage devices. This eventually speeds up commerce of a product that an external advertiser is trying to sell.

DETAILED DESCRIPTION

Hereinafter, utilizing the appended drawings as a guide, the current system will be described in detail. All elements that shall be explained will be referenced with a corresponding number and the same number may be used repeatedly to avoid duplicating similar explanation of the said elements.

Figure 1A:
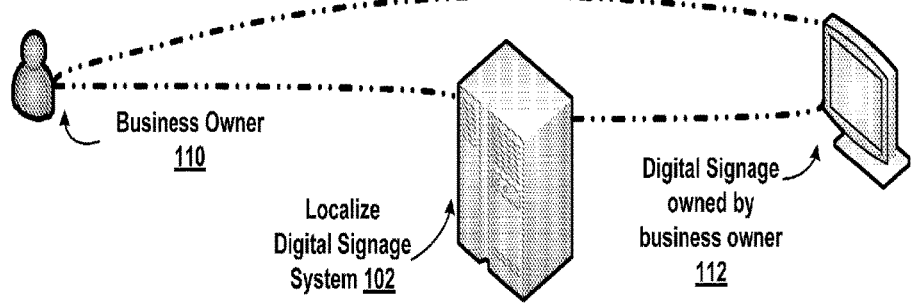
FIG. 1A is an explanatory view showing the configuration of a localize digital signage system of prior art according to the embodiment.
Figure 1B:
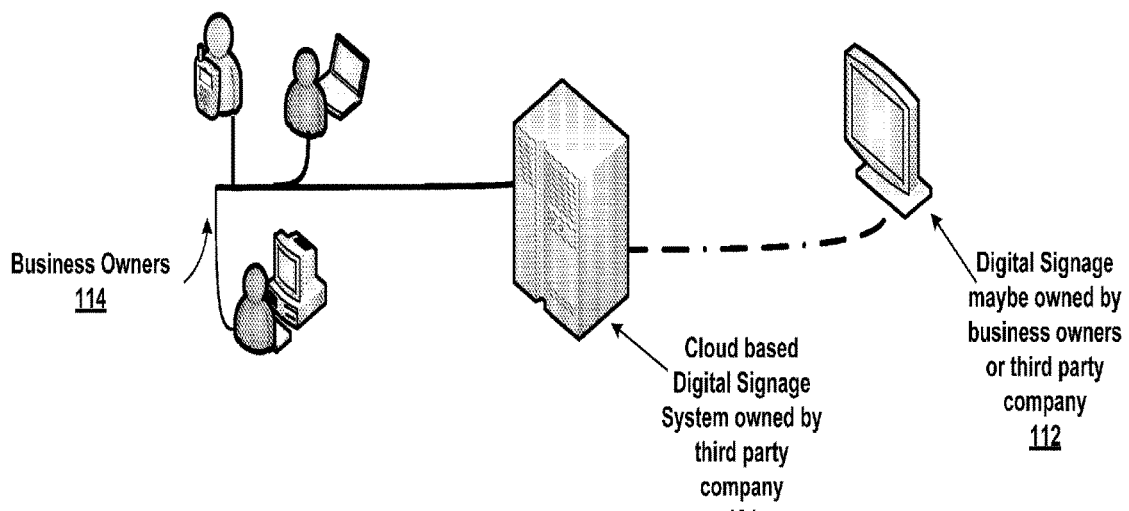
FIG. 1B is an explanatory view showing the configuration of a cloud based digital signage system of prior art according to the embodiment.
Figure 1C:
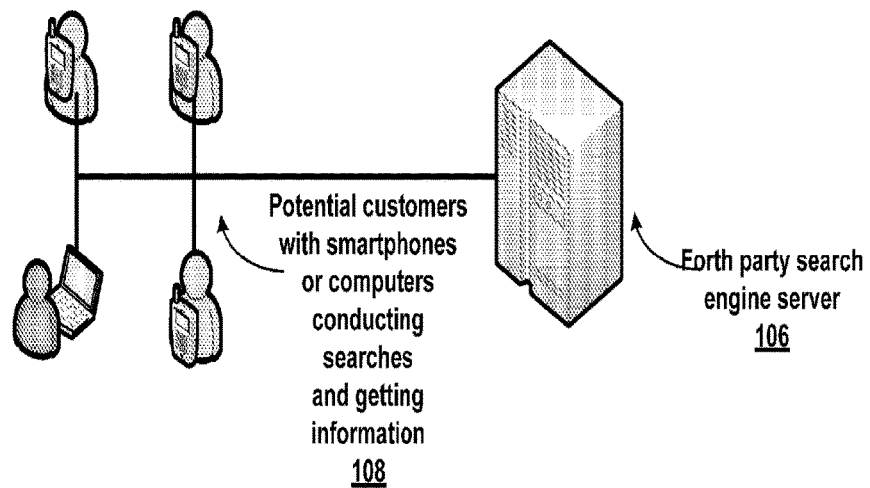
FIG. 1C is an explanatory view showing the configuration of potential customer searching for information of what they have visualize from a digital signage system according to the embodiment.
Figure 2:
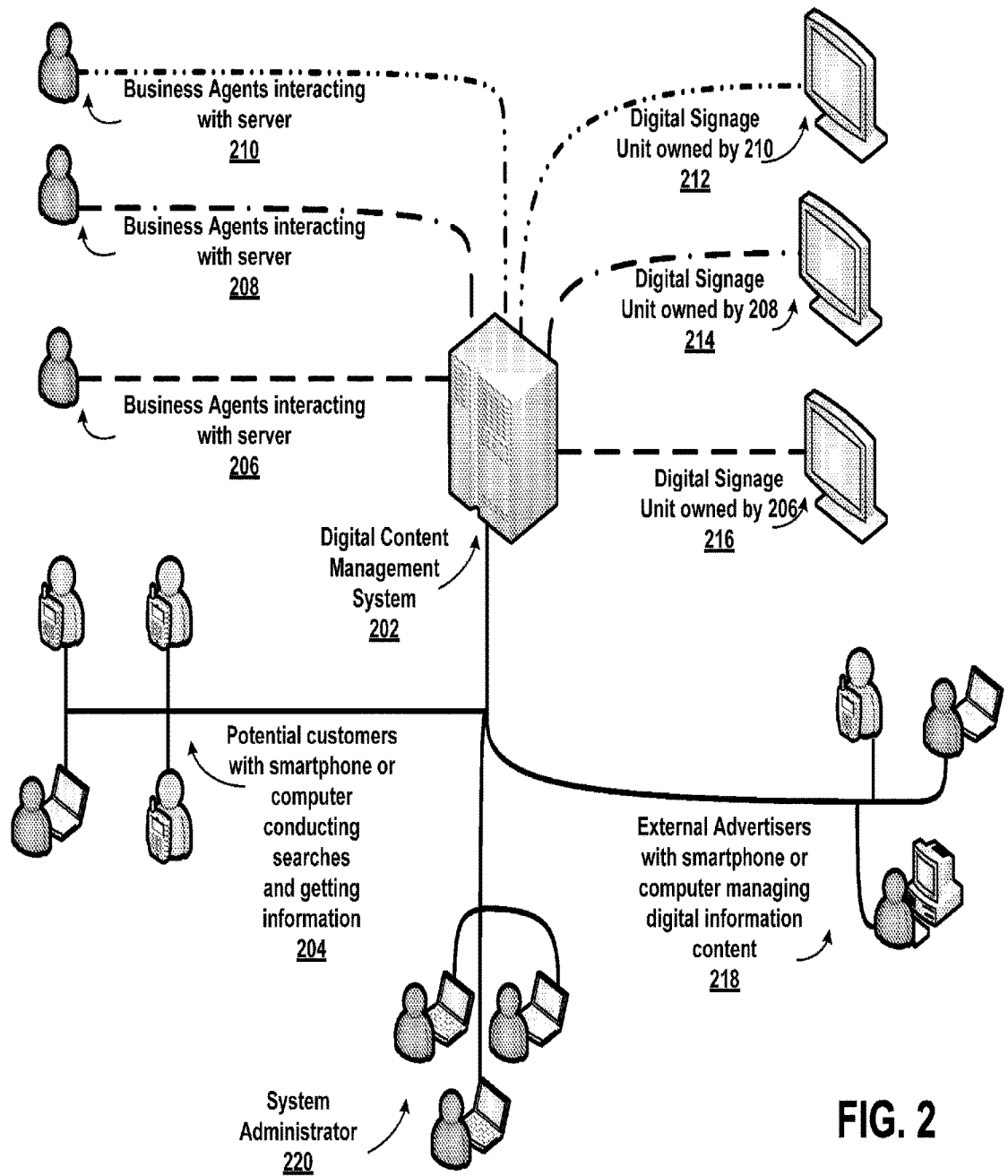
FIG. 2 is an explanatory view showing the current digital content management system diagram showing a management server according to the embodiment.
Figure 3:
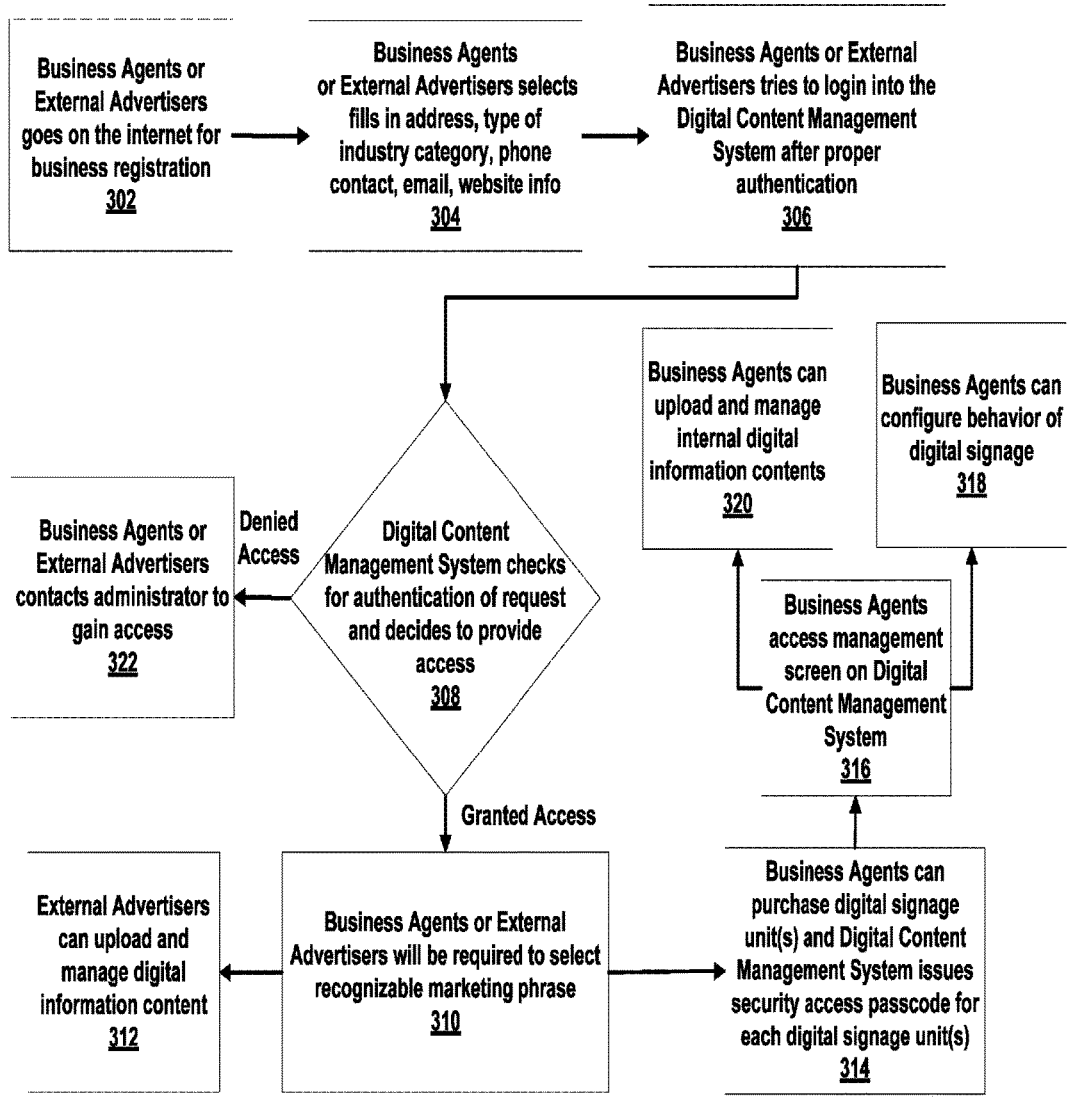
FIG. 3 is a flow chart showing the operation of the digital signage unit after being bought and setup to access the digital content management system according to the embodiment.
Figure 4:
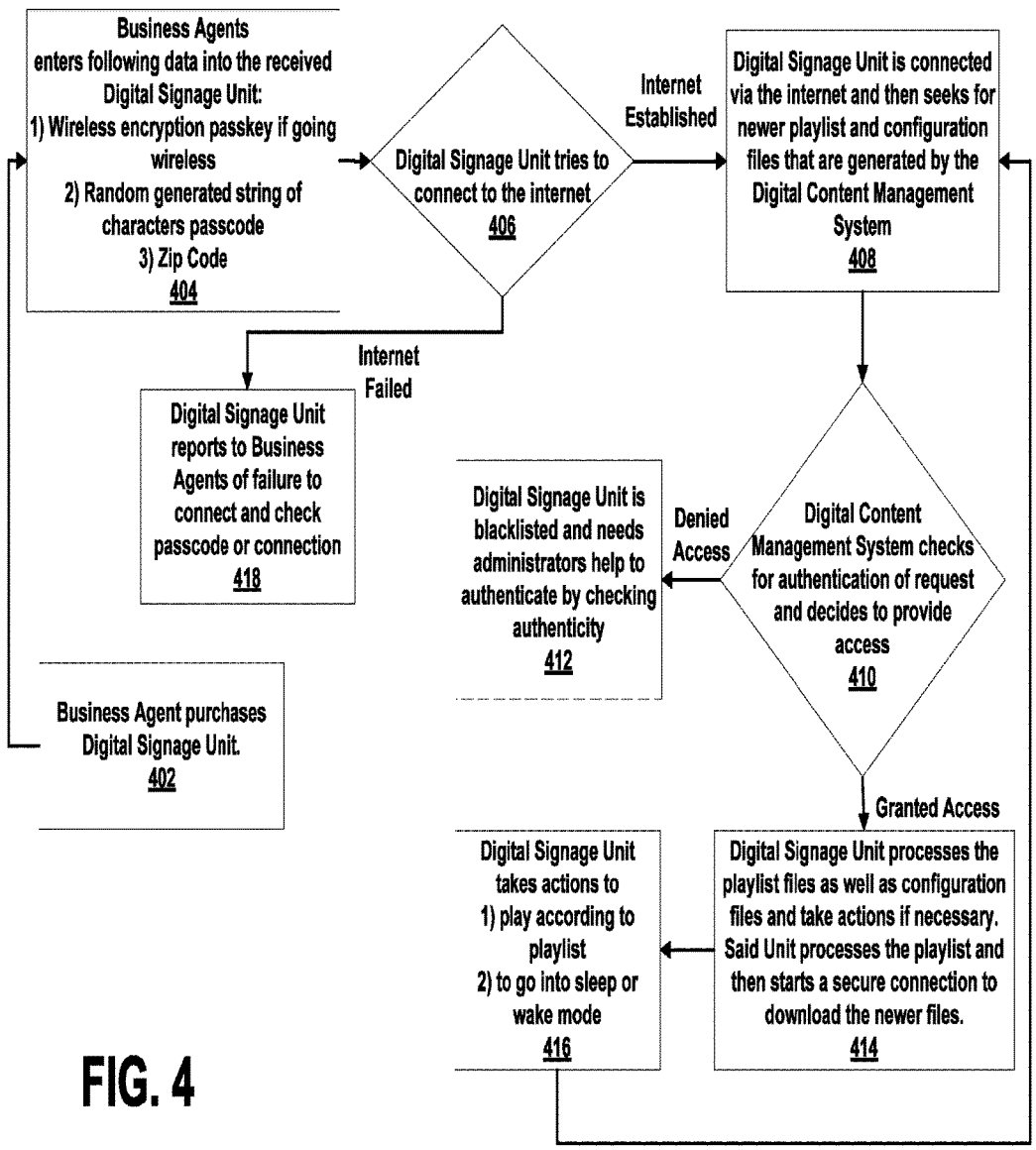
FIG. 4 is a flow chart showing the initial setup process of the digital signage unit according to the embodiment.

The digital content management system 202 in FIG. 2, is a cloud based system which provides the user the capability to upload and manage their digital information content within the system. System 202 was built using a combination of programming languages that may consist of PHP, JavaScript, Bash, Pear, Actionscript, html, and Java. The system 202 also contains all the business information of each company that has opted to join the network. Only a legal entity with a legal Employer's Identification Number or EIN, (in other terms, a tax ID number) is allowed to join the network. This is to minimize the unethical usage of the system for sending in information that maybe unacceptable for the general public. The system 202 is connected via an internet medium or computer network, and other users shall utilize similar internet means to communicate with each other.

System 202 is designed for four main user categories, predominantly the business agent that chooses to purchase the digital signage unit, together with the external business advertisers, 218 who uses the system 202 to advertise by uploading their advertisement content. Business agents can automatically participate in the rewards monetary program for being an advertising agent for system 202. On the other hand, external business advertisers use system 202 to advertise their product and services. The third user category can be the potential consumers 204 that utilizes the search feature to retrieve information of the external business advertisers, based off what they saw and recalled from any digital signage units 212, 214 or 216. The final user category is the system administrator that consist of a group of people that administer, and filter any inappropriate digital information content before it is transmitted to all the targeted display information digital units of 212, 214 and 216. It should be understood that the administrator are a single business entity that runs and maintains the system 202.

Business agents 206, 208 or 210, purchase their own respective digital signage unit, 212, 214 and 216. They are advised to appropriately mount and install their corresponding units 212, 214 and 216 at appropriate locations on their premises to yield maximum exposure and benefits towards their businesses as well as external advertisers 218. Business agents 206 can only manage and control his or her own personal digital signage unit 216 and said user is not capable of configuring and managing content or behavior of digital signage units of 214 or 212. This is also true for other agents of business user 210 and 208, they are not able to gain access or control of digital signage unit of others. A security feature shall be integrated into the system 202 which authenticates all remote digital signage units to not allow other business agents to control digital signage units of others. The ultimate control point is completed by system 202.

In order to participate as an advertising or information relay agent, a business agent, 206, 208 or 210, has to first register his or her business 302 with system 202. During the registration process, the business agent together with the external advertisers, both users have to enter mandatory data of their respective business name, business address, type of business industry, phone or fax contact, email, and website info (block 304) into system 202. After the business registration process is completed, both parties, 218 and 206~210, can login 306 into system 202. If login fails 322, either users are required to contact system 202's administrator for login remedial.

Immediately after being logged in, both users, 218 and 206, 208 and 210, are required to select any recognizable marketing phrase 310, which uniquely identifies the business entity when a potential customer uses the search feature of system 202. Each business entity may only pick and select one free recognizable marketing phrase to link their product or services to the search back feature of system 202. If additional marketing phrases were required, they would have to pay a yearly subscription fee for any additional marketing phrases. An external advertiser can immediately begin to upload and manage any digital information content 312.

A business agent 206, 208 and 210 can also be granted access to purchase the digital signage unit from the web store of system 202, shown in block 402. Business operations under the system 202 business entity can process the purchase and ship the purchased digital signage unit to the business agents. Upon receiving the digital signage unit, the business agents then activate the digital signage unit via a onetime setup process. The 212, 214 and 216 units are powered up from the closest power source. The digital signage unit, 212, 214 and 216 are connected to the internet through either wired or wireless connection, whichever is convenient for the business agent. A business agent can try to gain internet connection by entering their own network security passkey shown in block 404, if required. If not required, the digital signage unit may then connect to the internet based of the business agent's network selection. All selections are touch screen enabled, which may be the only method a user can communicate with the digital signage unit.

Also during the initial setup of block 404, the business agent enters a secret pass code uniquely generated by system 202. The pass code is a randomly generated pass code unique to each business agents, which identifies each digital signage unit during access for advertisement playlist and configuration information retrieval. All pass code generation can be obtained upon the business agents registering the digital signage unit, which is shown in block 314.

Business agents can then configure or setup the digital signage units mentioned in block 316. The registration process of each digital signage unit together with the units corresponding settings or configuration can be configured via the digital signage unit itself, or via the web based control management system interface 318 within system 202. Upon completing the registration and activation process of each digital signage unit, the business agents can begin to upload internal advertisements or desired digital information content into the local digital signage unit, depicted in block 320. The business agent has both options to advertise either internally or externally. If the business agent chooses to advertise as an external advertiser, hence adopting the dual role within system 202.

The digital signage unit 212, 214 and 216 is built in such a way that it is only capable of communicating with the system 202. This creates a close loop system thus isolating any possible foreign intrusion of unauthorized digital signage. Such a system allows for increased level of security, which is vital since according to the embodiment, system 202 can involve a lot of monetary transaction. Upon successful connection to the internet, the digital signage unit can then try to obtain new playlist and configuration files from system 202, this is depicted in block 408. When a request to retrieve fresh playlist or configuration files is made to system 202, system 202 uses the pass code generated from block 314, to determine access of the digital signage unit shown in 410. If request is not authenticated, as shown in block 412, then the corresponding unit can be blacklisted, and not be able to gain access, until business agent seeks remedial from system 202's administrators. Again, this is the security scheme implemented to disable foreign digital signage units into accessing the system 202 content. If access is granted, as shown in block 414, then the corresponding digital signage unit can retrieve the latest playlist as well as configuration files. The corresponding units may process and compile a schedule of playtimes which is also dependent on the window of playtime available based on the sleep and awake time window of each digital signage unit which is depicted in block 416. This sleep and awake behavior is designed to enable the business agent to conserve electric power, during times, when the business agent determines that their business premises are to be closed, hence having no advantage in displaying any information or advertising exposure towards the public.

Playlist are divided between peak and non-peak hour playlist, peak hour playlist are valued higher, due to the obvious reasons of higher people traffic in a location. In return any peak hour playlist, can also cost more for external advertisers. The appropriate charges are based off a defined pricing model programmed into system 202. A possible peak hour window could be defined as morning time, 7~8:30 a.m., which captures the rush hour audience, the afternoon lunch traffic, could be 11:30 a.m. to 1:30 p.m. and going home traffic, 4~6:30 p.m. Such time may vary depending on the location, and can be adjusted by the administrator of system 202. The main reason for this, is to capture the largest audience. The bigger the audience, the bigger the customer base that uses system 202 for their searching purposes. Regular non-peak hour playlist are valued a nominal or regular charge fee against the external advertisers.

According to the embodiment, a digital signage unit can go to a sleep mode. The wake mode is when the digital signage system powers up, and the display screen turned on. These modes are controlled by the business agents. Based off the available wake time, determines how much a monetary reward a business agent gets. The smaller window of wake time can yield a lesser monetary reward gain and vice versa. However, the wake time is capped at a certain number depending on the business industry, which means if a business agent selects 24 hours, and depending on the industry, system 202 automatically calculate the payout reward based off a maximum hour, example 20 hours maximum limit. Again, the reward is based off an internal pricing model programmed into system 202.

Figure 10:
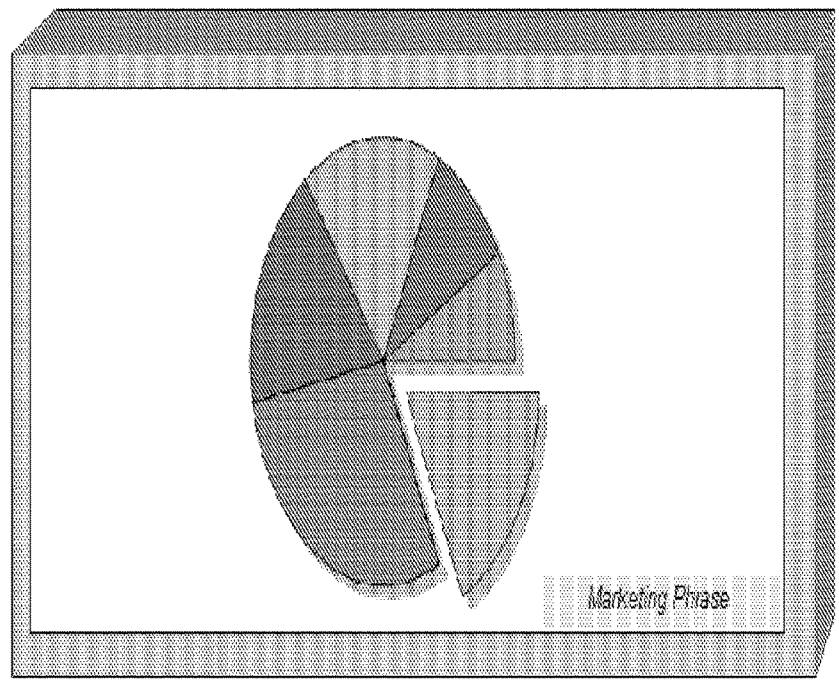
FIG. 10 is an explanatory view showing a digital signage unit with the recognizable marketing phrase according to the embodiment.

FIG. 10 shows a digital signage unit with a recognizable marketing phrase embedded on the digital information content. The digital signage unit is designed to be light weight and an acceptable shape and color that fits most business premises. The size of the digital signage units are presumed to not obstruct the flow of business of a business premise but still yield positive results in providing good exposure of digital information content. The digital signage unit may consist of a central processing unit located on a main board. The main board is also equipped with a video processing unit which ultimately transmit the video data to the screen. The main board may also have an integrated sound card to enable sound to be played. However, the sound feature is disabled by default, and depending on the location and function, the business agent may want to enable the sound feature. A touch screen digitizer circuit is also required, to enable user input. There may be no other form of user inputs, other than the touch screen digitizer. The digital signage unit also is integrated with a sensor mechanism which will be explained in detailed later on in this embodiment.

The digital signage unit also may have solid state drive which stores all the operating system, configuration files, and most importantly the digital information content files. The digital signage unit may only be configured to function for the sole purpose of advertising and displaying selected information on the screen. The digital signage may not have any other purpose other than the said task. Once a playlist is retrieved, depicted in block 502, the digital signage unit decodes the encrypted playlist, and saves it in the solid state drive, within a defined database table. The digital signage unit recompiles a local playlist, based off the configuration files settings, taking into account the wake time window, assigned by the business agent. If there are any additional information such as weather, time, emergency alerts, the digital signage unit processes those requirements accordingly. Finally, one long playlist may be generated automatically and played accordingly. This action is reference in block 506. As mentioned before about the peak time and non-peak time window, during computation of the bigger playlist, the system may also take into account of these time windows, shown in block 508. It is made known that the digital signage unit may go through an infinite loop to retrieve fresh digital information content from system 202. Ultimately the digital signage unit may act as a slave computer, hence the one time setup registration and activating process per digital signage unit.

The digital information content may comprised internal and external advertisement content. Internal content are playlist provided by business agents, that chooses to advertise or relay information of their own product and services. A business agent has the option to actually configure each digital signage unit to fully advertise for external advertisers, which means maximum reward payouts. Business agent may pick from any 25% intervals, starting from 0%, which means to fully advertise only for themselves, and to 100% which means to fully advertise for external advertisers. The default option is 50%, which means exactly 50% of the air time being played is internal advertising, and the remaining half is for external advertisers according to the embodiment.

Business agents are required to upload and manage the internal digital information content from a web-based application, controlled by system 202. Within the application of system 202, a business agent can provide a simple worded description, title and location of the digital signage unit. An image option is also provided to simplify the indication of the location of the digital signage unit, to indicate the exact location of the digital signage unit. This is to avoid any confusion between other digital signage units. If the business agent decides to have more than a single unit of the digital signage in the business premises, system 202 is built in such that a list of all such digital signage unit is easily manageable. A pull down list of every digital signage unit is provided to allow the business agent to focus on any digital signage device owned and manage it.

Figure 6:
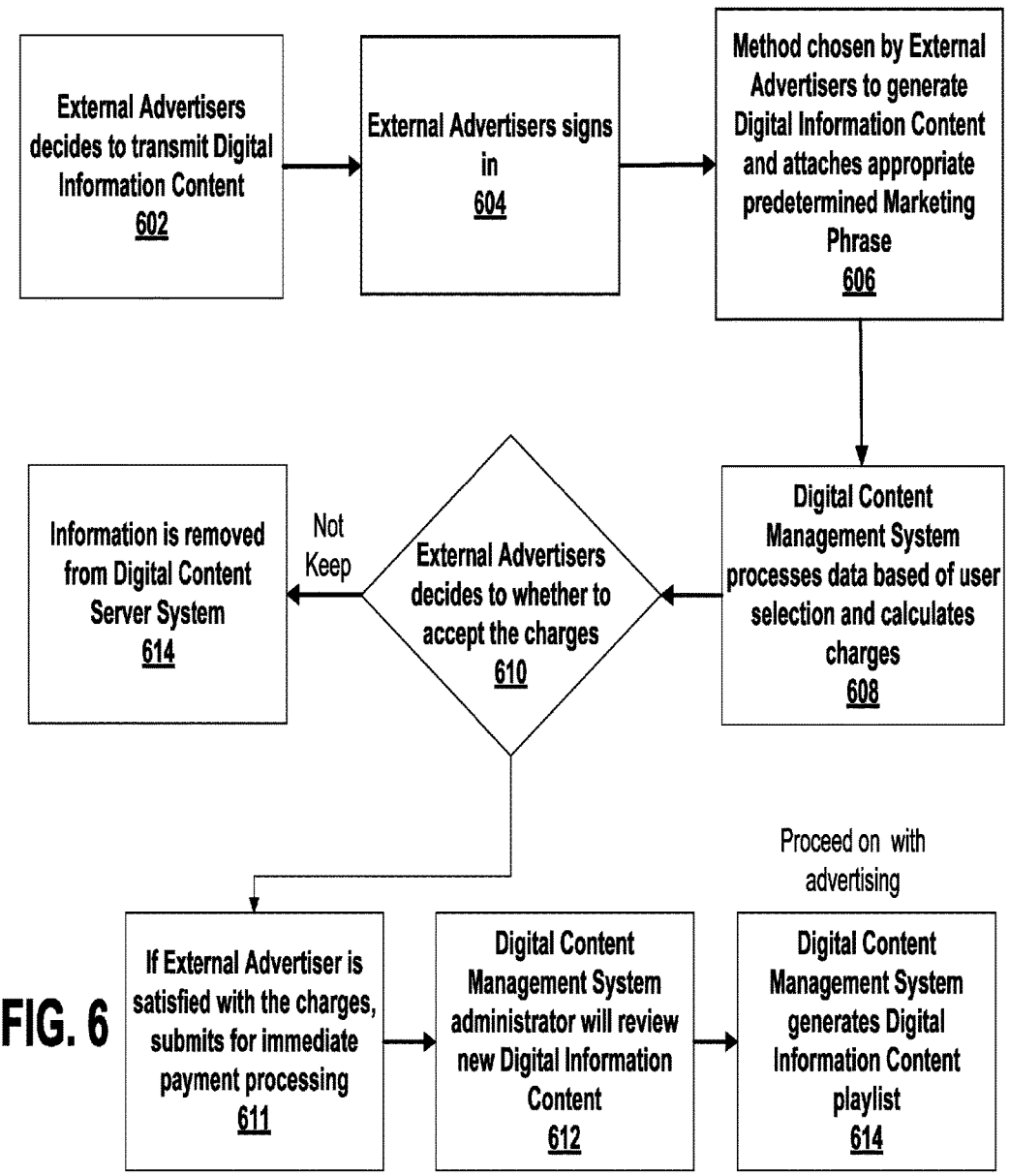
FIG. 6 is a flow chart showing the process where external advertisers interact with the digital content management system according to the embodiment.

In FIG. 6, it shows the process flow of an external advertisers utilizing system 202. The external advertiser user can sign in, shown in block 604. Once the respective user gains access, the user has a choice to use the internal built application in designing the digital information content or directly upload a pre-made digital information content which may be made by a third party program external to the entire system. The business agent can also utilize the same application for their own internal content, there is an option for both users to select whether they want internal or external or both advertising. When a digital information content is uploaded, it is processed to determine the length of time as well as converted to a standard video file format to ease and standardize the digital signage design, which in this case is flv or flash video format. Other possible formats can be used, it is just a matter of using the correct codec and player to read that digital media format on the client end.

In regards to an external content, system 202 calculates the corresponding charges an external advertiser would have to pay for that particular digital information content they have uploaded. The system can then output the charges, prior the external advertiser accepting to the transaction, which is shown in block 610. If the external advertiser accepts the transaction, they may immediately be charged a monetary value, which could be paid via a credit card, or bank account money transfer, which is depicted in block 611. If the external advertiser decides to reject the transaction, the external advertiser is able to edit the submitted digital information content, in order to achieve the desired charges. Practically the external advertiser can do this as many times as they see fit. However, every adjustment may or may not yield a price change. If an advertisement was uploaded and an external advertiser has successfully made a payment for those charges, any new modification may result in a price difference. If such modifications yield a higher price, system 202 calculates the differences in the charges, hence the external advertiser having only to pay the difference. But if the modification appears to be a cheaper, there may be no credit towards the event, since all processed transactions are considered final sale event, and no refund can be issued. Example for such can be, an external advertiser decides to extend the life span of the advertisement, which means more time is needed to play the advertisement. This may result in a price increase towards that respective advertisement.

Figure 6A:
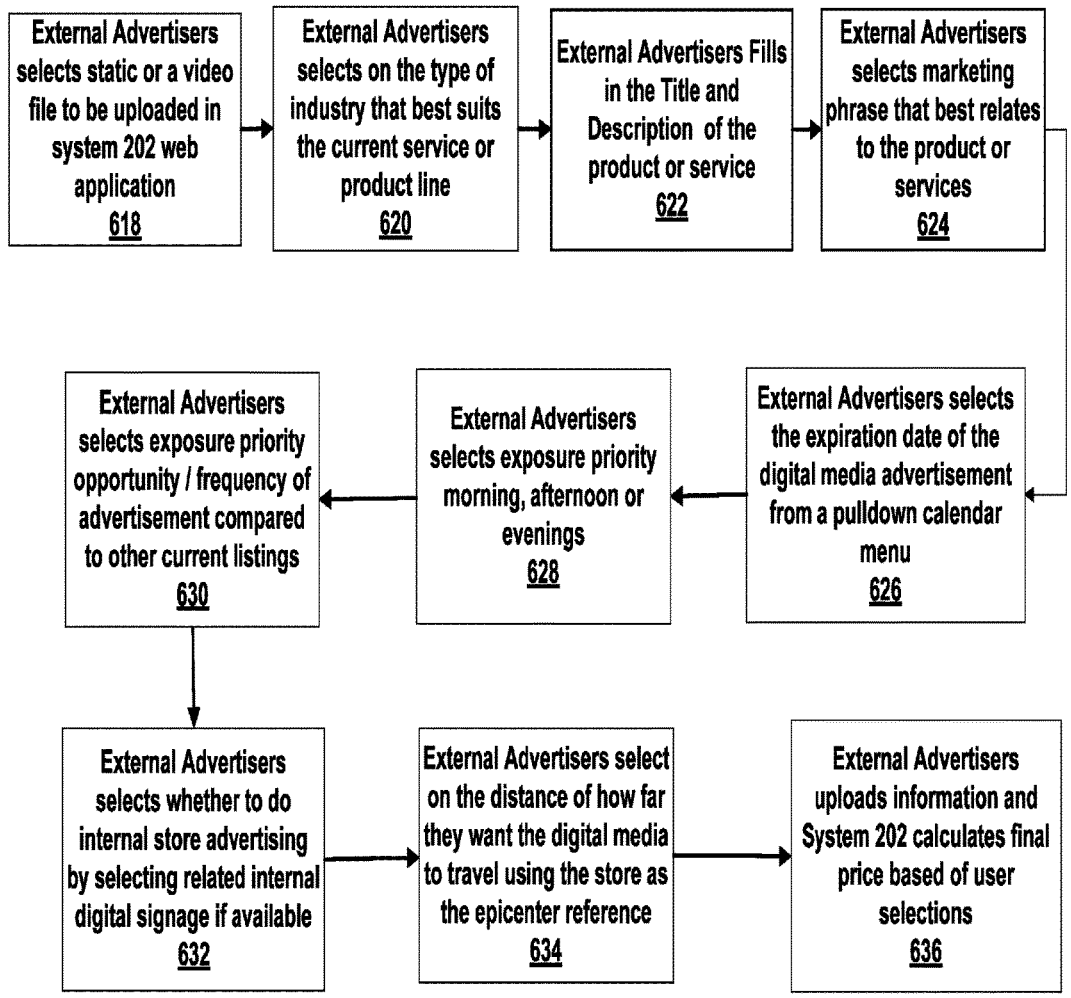
FIG. 6A is a flow chart showing a detailed process of external advertisers submitting a digital information content or advertisement into the digital content management system according to the embodiment.

In block 608, the external advertiser is given several choices, which ultimately decide how and where the digital information content or advertisement being transmitted. To explain block 608 better, FIG. 6A is derived, which further elaborate the intricate portion of the user selection ability in order to transmit the digital information content to the masses or public. As mentioned before, the advertiser can choose to upload a new digital information content. Also mentioned before, the advertiser can either choose the internal application built within the system to generate the digital information content, which could either be a static image or a moving video. On the other hand, users can choose a third party program to generate the digital media content, prior uploading into the system 202, this is depicted in block 618. Progressing into block 620, the advertiser can pick on the type of industry and sub industry compiled within two pull down fields. By selecting the corresponding industry and sub industry, this decides how the advertisement is compiled with the other pool of advertisements within system 202. Example of industries may be construction, manufacturing and retail trade. Corresponding listing relative to the industries in order sequence are construction of building, food manufacturing, and gasoline stations.

Next in block 622, the advertiser picks on a simple title and description. Such information may not be known to the public but rather to improve the advertiser's manageability of many other digital information content that maybe present under the advertiser's account. In block 624, the advertiser can pick any of the pre-setup marketing phrase. This was initially setup during the login process, which was described in block 310. As a default, all registered business can have only one marketing phrase picked. However, as mentioned before, business may have the option to purchase additional marketing phrase if needed. Next in block 626, the advertiser decides on how long the advertisement on digital information content should be running for via a pull down calendar menu. Obviously, the longer the advertisement is running through the masses, the costlier it becomes. In 628, the advertiser has the choice to pick on popular time intervals to increase the frequency of the advertisement being played. The choices can be in the peak morning hours, peak afternoon hours or peak night hours. The assumption for peak hours is defined as the highest amount of traffic to occur. In 630, the advertisers pick on the weight factor of that advertisement in comparison to other advertisement, he or she has uploaded into the system. This also decides the placement and frequency of the advertisement among the other pool of advertisements.

Other than the time and frequency variables, one crucial variable that may affect the cost of the advertisement dramatically is the distance of how far the external advertiser would want the advertisement to be transmitted shown in 634. The distance factor mentioned here can be a selection of distance within a preconfigured distance in radius length using the external advertiser business point as the central point of reference. Selection such as advertising within a building, along a street, 3 miles radius from the point of reference, higher increments of distance radius, entire state, multitude of states in a country, as well as the final option of advertising in the whole country. The charges varies according to the distance selected, the further away the advertisement has to travel from the epicenter of the business entity, the more expensive the charges be imposed. The derivation of cost is influenced by the number of business agents that the external advertisers use to advertise within that distance circle. Since each business agents is linked to a physical address location, hence a radial distance of number of business agents can be calculated.

Once completed, the advertiser clicks on the save and submit button hence uploading all necessary information to system 202. System 202 checks the validity of the file uploaded together with the completed user selection and calculates a price for the advertisement based of the number of digital signage that is available to advertise externally as well as all the variables selected in FIG. 6A. The advertiser must have a credit card or banking payment information on file within the system in order to process the payment. This is crucial, as it allows advertisers to submit the digital information content or advertisement at a faster rate and minimize hassle.

Upon reviewing the charges, the external advertiser can proceed on to allow this most recent digital information content to be transmitted to other digital signage units. With this design scheme of the embodiment, external advertisers have the freedom to create and generate their own digital information content or advertisement to be played on other digital signage units, without having to go through the owner of a digital signage unit. If the payment transaction does not go through, the advertisement is saved within the database but is not propagated to other digital signage devices owned by other business agents. In such a case, the advertiser does not have to go through all the hassle of completing the online submission of the advertisement, but rather reprocessing the transaction if the advertiser has sorted out the payment issues which halted the initial transaction of the submitted advertisement.

As a safeguard mechanism, all initial digital information content must be reviewed by the administrator of system 202, this step is shown in block 612. After a certain review period, when an external advertiser has deemed worthy of not imposing violating digital information content, the respective external advertiser's account may not be subjected to future reviews unless proven otherwise. The review period can be adjusted by the system administrator to whatever deemed necessary. Ultimately, once approved, system 202 generates a new playlist content for all affected digital signage units depicted in block 614, and ready to be retrieved by the designated digital signage units, mentioned before and shown in block 502.

Figure 5:
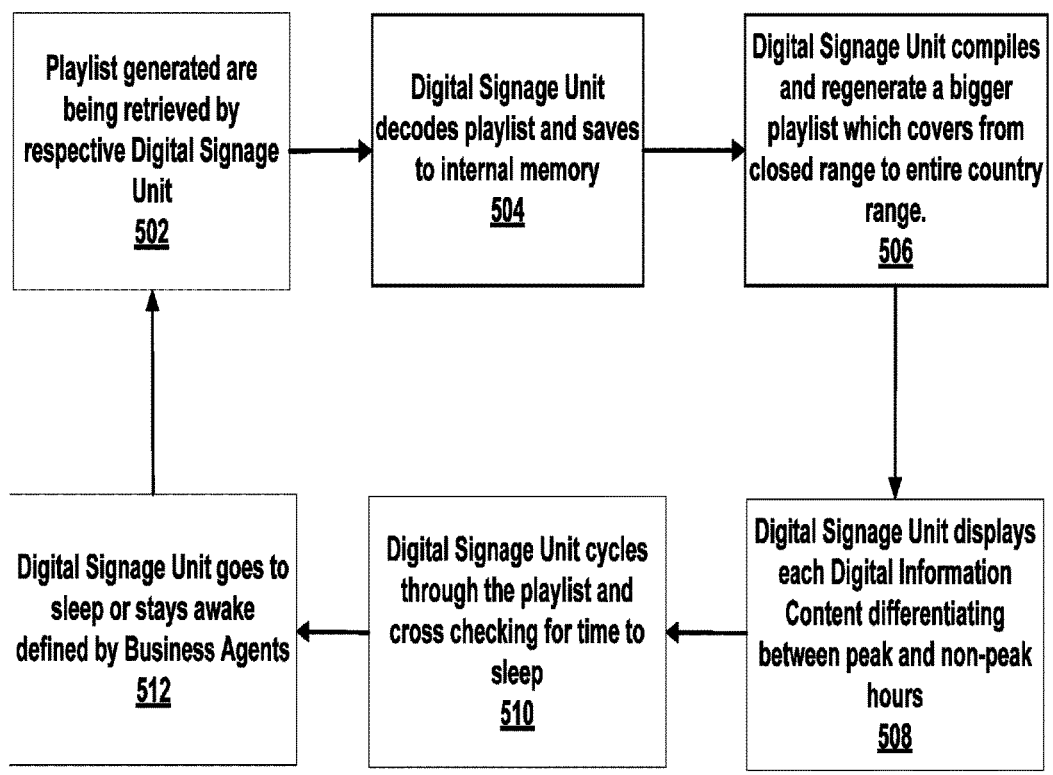
FIG. 5 is a flow chart showing the internal operation of the digital signage unit according to the embodiment.

The playlist generated can be stored in a serialized data format onto the database server, which is located on the system 202. A serialized format is required since it is a representation of a string data, in oppose to an array data, which is not database friendly. When a digital signage unit schedules a retrieval of updated playlist or configuration files, it sends the request to the system 202. System 202 authenticates, and once authenticated, encrypts the playlist data which are transmitted via the internet to the targeted digital signage unit that initiated the request. This is an ongoing process, depicted in FIG. 5, which shows a never ending task programmed into the digital signage unit.

To optimize the processing load for system 202, a unique header data block, which consist of the last known downloaded timestamp of the data request is read by system 202. System 202 may filter this header file to identify whether any new content is required to be transmitted to the respective digital signage unit. If no new content is required, it allows system 202 to efficiently move on to cater other requests from other digital signage units. However, if there is a new media within the playlist, system 202 can determine the difference between the last and newest playlist and only transmitting on the difference of the playlist.

This whole process of this embodiment enables system 202 to be secured, which protects the system 202's automatic processes, in the playlist generation, down to the reward payout scheme. These process which includes the business user's registration into the system, purchasing a proprietary digital signage system that comprised the software that allows the user to register, authenticate with the system 202, and eventually complete the task of the never ending task of playlist retrieval, computing the playlist schedule, and then displaying the corresponding external and internal digital information content describe earlier, and reacting on any configuration settings such as the wake up and sleep mode operation, and finally embedment of the recognizable marketing phrase onto each digital information content or advertisement are vital sequence process that completes the system 202.

Every digital information content that is being processed is played on a software player that which identifies two forms of data. First the digital information content itself, second the recognizable marketing phrase. The latter point is being displayed on a separate software layer, in respect to the first point, which is the digital information content. This allows the business users, which can be the business agents or the external advertisers to change any recognizable marketing phrase without affecting the digital information content or advertisement original format. This process allows a faster processing time by the system 202, which instead of recompiling and reformatting any uploaded digital media, such as an image file, or a video clip, to be excluded in this process. However, a new playlist may need to be generated so that a digital signage unit can have the newest information of a playlist.

Figure 7:
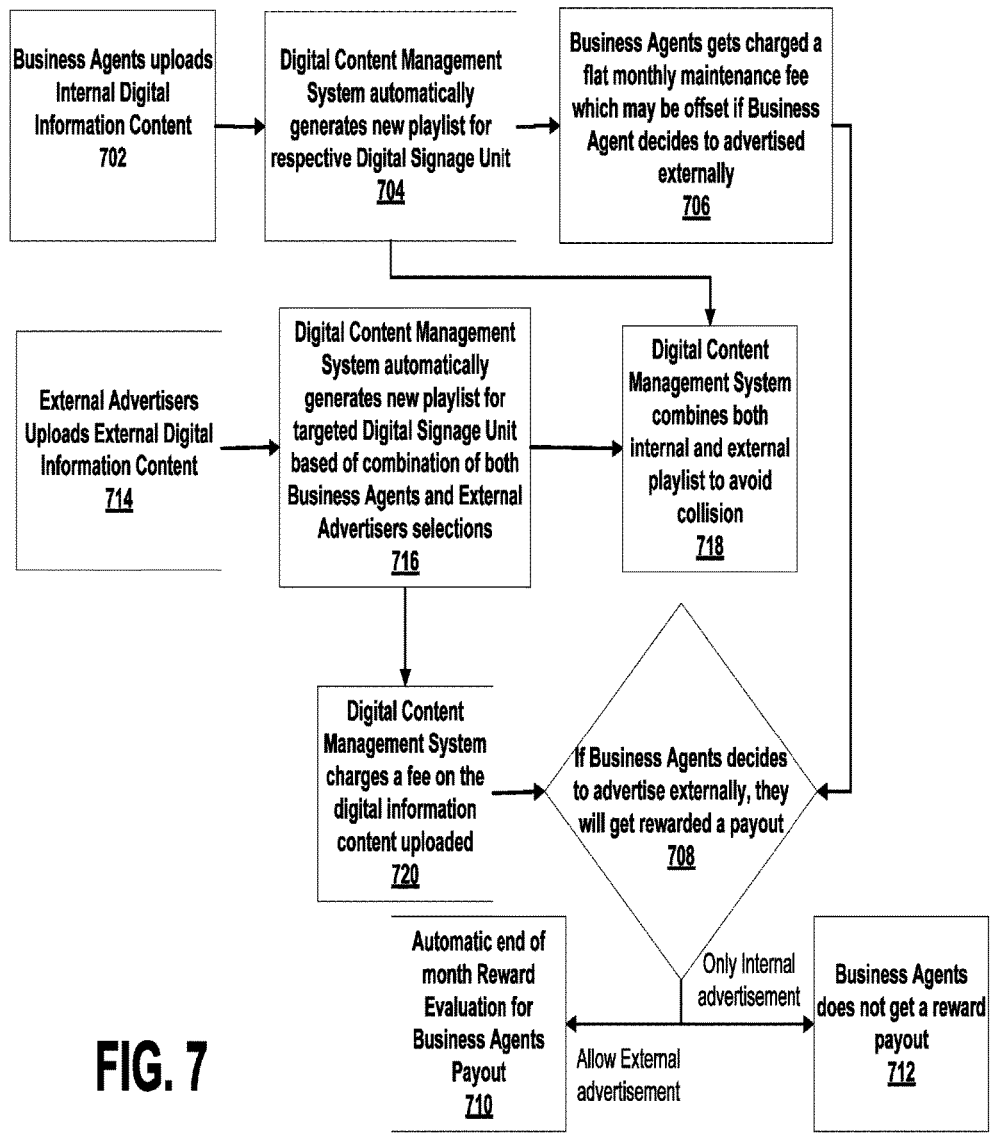
FIG. 7 is a flow chart showing determination of reward payout process according to the embodiment.

In FIG. 7, it shows the overview of when both parties are charged a fee, as well as when the business agent is rewarded a payout. System 202 allows both parties to upload the digital information content into the system. The business agent can have the option to control how the digital signage unit behaves in terms of only advertising for themselves, or to mix advertise for themselves as well as for external advertisers, or to only advertise for other business. This step was mentioned in earlier in the embodiment, as well as shown in block 318 and 708.

If a business agent decides to not advertise for other businesses, meaning strictly self-advertising, they have to pay a maintenance fee, for utilizing the system 202 services. Again, such internal advertisement is not to be transmitted to other digital signage units that the business agents do not own. However, a business agent can also choose to be an external advertiser, hence holding dual roles in this system 202. It is to the business agent's advantage to also enable the digital signage unit to accept external advertising to generate revenue to offset the monthly maintenance fee, which is depicted in block 706. When a dual role condition is assumed, that is, when the system 202 combines both internal and external playlist and computes that both playlist will not interfere with one another, and still allows the prospective digital signage unit to perform adequately, this is shown in block 718. The playlist can be compiled in such a way that competitive industries do not collide. For example, an auto body repair shop may not want to advertise for another auto body repair body shop. A distinguishing word or color coded display on the screen to separate between internal and external advertisements when such digital information content is being played. This is to reduce any confusion it may create among potential customers.

When a business agent assumes the mentioned dual roles, the factor that may decide the reward payout is primarily dependent on factors already mentioned in this embodiment, such as how much ratio the business agent allows for the external advertising versus the internal advertising onto their respective digital signage unit or units. Each digital signage unit is unique from each other, in the sense that if a business agents decides to own more than one digital signage unit, they can adjust independent ratios of external advertising versus internal advertising. For example, if a digital signage unit is located in front of the main entrance of the business premise, that digital signage unit could be configure to increase internal advertising more than external advertising, to indicate to potential customer that the store maybe throwing a promotion, thus attracting the potential customer into walking into the business premise. Within the store, the business agent may select to advertise more for external advertisers. However, the payout system is confined in such that a business agent can only get rewarded to a maximum value point allowed by system 202 payout system. It is worth noting that owning more digital signage units per business entity does not generate more monetary reward, if the quantity of digital signage units passes a saturation point.

Each digital signage unit is integrated with a sensor mechanism to measure the intensity or how much traffic the digital signage is exposed to. The sensor could be a motion sensor or an infrared sensor, whichever is more effective depending on the environment. The digital signage unit may count the number of unit of people that a digital signage unit is exposed to the digital signage. It should be made known that if the digital signage unit is blocked, the image and/or the count is then sent back to the system 202, to be quantified. A higher density of more populated area, may yield a higher multiplier which increases the reward payout. This is indicated in block 812. Depending on the satisfactory results from determining a legitimate count, system 202 may be configured to deactivate this parameter, to ensure a certain profit margin is met for the health of the business of system 202.

The charges towards the external advertisers are also proportional to the number of digital signage units that are in the scope of distance selection. This means, the more the quantity of digital signage units in the chosen distance scope, the higher the charges for each advertisement cost. This is to ensure that the business agent is always rewarded a minimum payout amount, instead of a dilution effect, which discourages potential business agents from participating with the current business model of system 202. A simple mathematical relationship can be made here, that the number of digital signage units in a region area, the more expensive the advertisement becomes. To make this happen, it is vital that the instant price calculation is performed right after the external advertiser submits an advertisement. System 202 can utilize all the known variables mentioned earlier in this embodiment, to calculate a final advertisement cost for each respective external advertiser. That being said, the price generation is based on a fair unbiased method, where the more people that is able to view the advertisement, the more expensive it becomes.

All rewards are taken from a fraction of all external advertisers fee charges that the system 202 computed earlier, which is shown in block 710. The balance of the fraction shall be accredited as revenue towards system 202 business operations. A periodical reward payout to each business agents shall be made based upon the agreed disbursement during registration. Business agents can select a monthly, quarterly of a year, or any possible time span. The default payment method is the quarterly of a year format. Both user category, the business agent or the external advertiser can view their balance history, profit generated or amount charged, by login into the system 202 to retrieve these information. Depending on the nature of the business, if a reward payout is expected, the business agent can decide to receive the monetary reward via a check or a direct deposit into a bank account.

Figure 8:
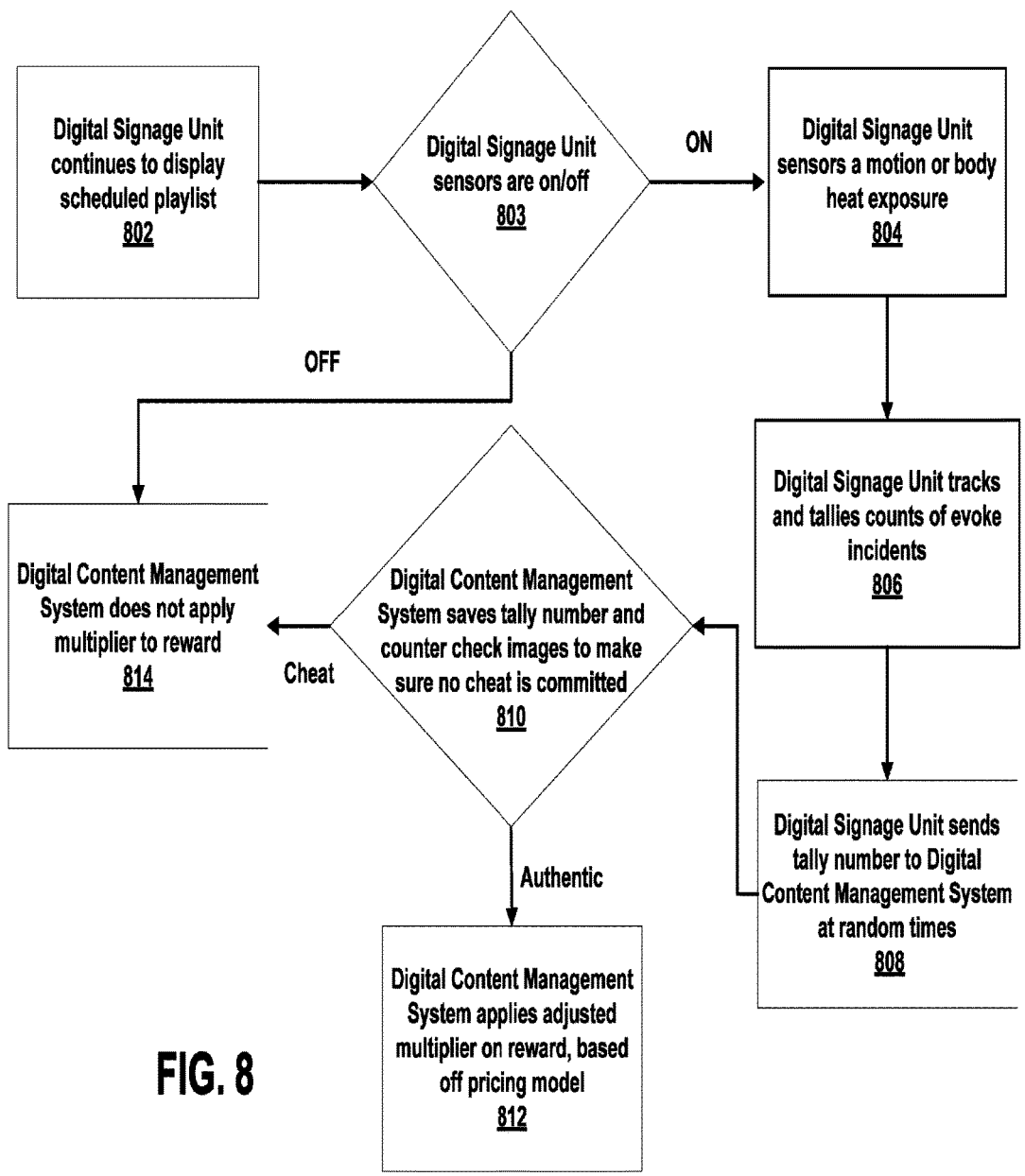
FIG. 8 is a flow chart showing a process flow of a digital signage unit completing daily task according to the embodiment.
Figure 9:
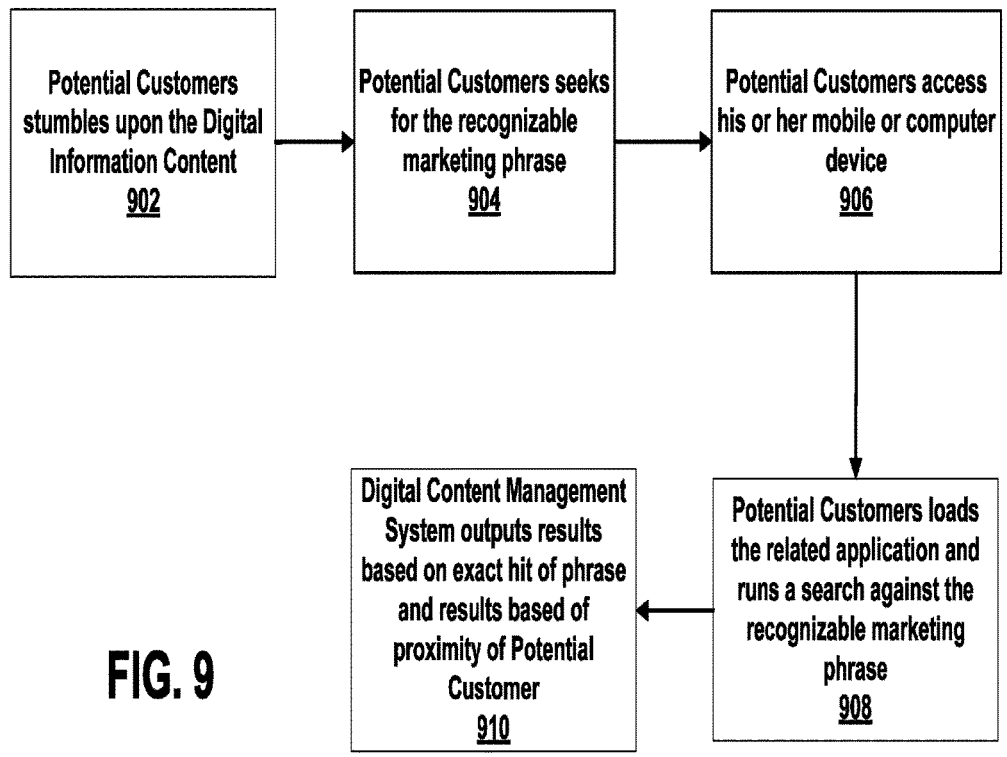
FIG. 9 is a flow chart showing a process flow of potential customers to search for the product or service according to the embodiment.

FIG. 8 shows the daily operations of a digital signage unit. The digital signage unit is programmed to periodically retrieve a new set of playlist, could be peak and non-peak hours, as well as the configuration files. However, to enhance the speed and efficiency of the system, during the retrieval process, if system 202 computes that there are no new playlist or configuration files, it may send back a message indicating so. The digital signage unit can continue to play the appointed playlist within the wake up mode time window pointed out in block 802.

One thing to point out here forward, it is fundamental for each digital signage unit to always seek for system 202 as a host. It is necessary to program all digital signage units to always look for a standard domain name, allowing the DNS server to always appropriately route all information request to the host domain name, which in this case is system 202. Another side feature which may prove beneficial to a business agent is the sensor mechanism that is integrated into the digital signage system. This sensor mechanism can be a motion detection sensor or an infra sensor, to sense and pick up any possible incidents of a human body that may be in front of the digital signage. This additional safeguard method is necessary to ensure all digital signage units are placed in a location that will prove beneficial, and serving its true purpose, which is to display information to the public. This portion of the process can be found in block 804 and 806.

In block 808, it shows when the digital signage unit randomly sends the tally number of a possible number of person that has evoke the sensors. An image maybe taken and relayed to system 202 for human intervention depending on the business circumstances, shown in block 810. This method can be disabled by the business agents if they decide to protect the privacy of the public, depicted in block 803. When disabled, this digital signage unit does not gain the extra multiplier factor to be considered for a higher reward, shown in block 814. Also if system 202 administrators have decided that a possible cheat occur, then the business agents may be blacklisted, and not getting a multiplier on his payout reward, shown in block 814, or permanently disabling the business agent ability to benefit from the system 202 reward program.

Another key feature of the embodiment is the recognizable marketing phrase. When a potential customer stumbles upon a digital information content or advertisement, they can actually capture this phrase on the standard location on the screen, in such that it does not distorts the original message or information of the external advertisers. As depicted on FIG. 10, the words are on a possible yellow or bright color floating background. The in-built web application where the user can upload the images is done dynamically, so that the image or video preview can appear on the screen. This enables the user to adjust to the floating background to make sure it does not block the advertisement. This is mentioned earlier, where the marketing phrase is to be on a second layer which is floating above the digital information content. The standardization of location on every digital signage unit is mandatory to enable any potential customer to quickly recognize this phrase, depicted in block 904, and perform a back search for this phrase in the system 202 search feature, shown in block 906 and 908. Upon retrieval of the corresponding business entity that acted as an external advertiser, they can try to retrieve more information regarding this business entity, or recommend and forward the information to other potential customers. Thus creating an automatic movement for the advertisement itself. Information that can be gathered are subjected to defined parameter inputted by the business registrant into the database, consisting of the contact number, types of services, location, information of a web domain, location of business on a map API and images of uploaded products and services.

The process of recognizing these phrases is implemented based upon the fact that potential customer may not have the time to write down a phone number, or even remember any long words that a digital information content or advertisement is displaying. One could argue that potential customers could take a photo via their mobile devices, but whether the potential customer may be quick enough in doing so is another matter. It is to the external advertisers advantage to actually pick and derive a recognizable marketing phrase that corresponds to their product or service, more so phrases that are catchy, easy to remember. For example, if a museum wanted to advertise for an event that is going to be held, the museum, now acting as an external advertiser, can then select a catchy phrase such as, "Go Go Washington".

It should be understood that this and other arrangement within this embodiment described herein are for example purposes only. As such, those skilled in the art will appreciate that other possible arrangements and derivation of other elements such as functions, orders, scheme, apparatus, groupings of functions, etc. can be utilized instead. In relationship to this embodiment, some elements may be omitted or removed altogether to achieve the desired results.

The present disclosure is not to be limited in the context of the embodiments described in this application and method, which are intended as illustrations of various features. Within the scope of the disclosure, functionally equivalent apparatus and methods including to those specified herein, will be apparent to those skilled in the art from the abovementioned descriptions. Any modifications and variations are intended to fall within the scope of the claims attached here after, along with the entire scope of equivalents to which such claims are entitled.

What is claimed is:

1. A method for playing digital media content on a network-enabled signage device installed in a stationary physical business premise of a business agent, the method comprising:

receiving, by a content management system, percentage participation information of external advertisers allowed by the business agent while setting up the signage device;

receiving, by the content management system, external digital advertising content submitted by an external advertiser, wherein the external digital advertising content submitted by the external advertiser is related to a business other than the business of the business agent;

receiving, by the content management system through a web-based application programming interface (API), advertisement preferences of the external advertiser including a distance that the external advertiser wants to propagate the submitted external digital advertising content from the external advertiser's business location as a central point of distribution to a stationary physical business premise;

evaluating a cost value for advertising the external digital advertising content through the signage device, and displaying the evaluated cost value to the external advertiser for approval;

generating a new playlist including an internal playlist merged with an external playlist, a temporal length of the external playlist within the new playlist being proportional to the percentage participation information allowed by the business agent, wherein the internal playlist is associated with internal digital advertising content relating to the business of the business agent stored in a storage unit of the signage device, and wherein at least a portion of the external playlist is associated with the external digital advertising content submitted to the content management system by the external advertiser;

transmitting the new playlist and the external digital advertising content from the content management system to the signage device through a computer network; and playing, on the signage device, the internal digital advertising content and the external digital advertising content in accordance with the new playlist.

2. The method of claim 1, wherein evaluating the cost value for advertising the external digital advertising content comprises evaluating the cost value in accordance with a distance from the physical business premise of the business agent to the external advertiser's physical business location.

3. The method of claim 1, wherein evaluating the cost value for advertising the external digital advertising content comprises evaluating the cost value in accordance with one or more parameters selected from the group consisting of time span of the external digital advertising content played on the signage device, specific hours during the day that the external digital advertising content is played on the signage device, frequency of the external digital advertising content being played on the signage device, and prioritization factor among pool of digital contents to be played on the signage device.

4. The method of claim 1, wherein generating the new playlist comprises generating the new playlist upon approval of the cost value by the external advertiser.

5. The method of claim 1, wherein evaluating a cost value comprises evaluating the cost value in accordance with the advertisement preferences of the external advertiser.

6. A content management system embodied in a computer hardware device communicable with a digital signage device through a computer network, the digital signage device being installed in a stationary physical business premise of a business agent, wherein the content management system is configured to:

receive percentage participation information of external advertisers allowed by the business agent while setting up the signage device;

receive external digital advertising content submitted by an external advertiser, the external digital advertising content being related to a business other than the business of the business agent;

receive, by the content management system through a web-based application programming interface (API), advertisement preferences of the external advertiser including a distance that the external advertiser wants to propagate the submitted external digital advertising content from the external advertiser's business location as a central point of distribution to a stationary physical business premise;

evaluate a cost value for advertising the external digital advertising content through the signage device, and transmit the evaluated cost value to the external advertiser for approval;

generate a new playlist including an internal playlist and an external playlist, a temporal length of the external playlist within the new playlist being proportional to the percentage participation information allowed by the business agent, wherein the internal playlist is associated with internal digital advertising content relating to the business of the business agent, and wherein at least a portion of the external playlist is associated with the external digital advertising content submitted by the external advertiser; and transmit the new playlist and the external digital advertising content to the signage device through the computer network; and instruct the signage device to play the internal digital advertising content and the external digital advertising content in accordance with the new playlist.

7. The system of claim 6, wherein the cost value for advertising the external digital advertising content is evaluated in accordance with one or more parameters selected from the group consisting of a distance from the physical business premise of the business agent to the external advertiser's physical business location, time span of the external digital advertising content played on the signage device, specific hours during the day that the external digital advertising content is played on the signage device, frequency of the external digital advertising content being played on the signage device, and prioritization factor among pool of digital contents to be played on the signage device.

* * * * *